Sept. 25, 1923.
W. J. KESSEL
GARDEN TOOL
Filed March 11, 1922
1,469,160
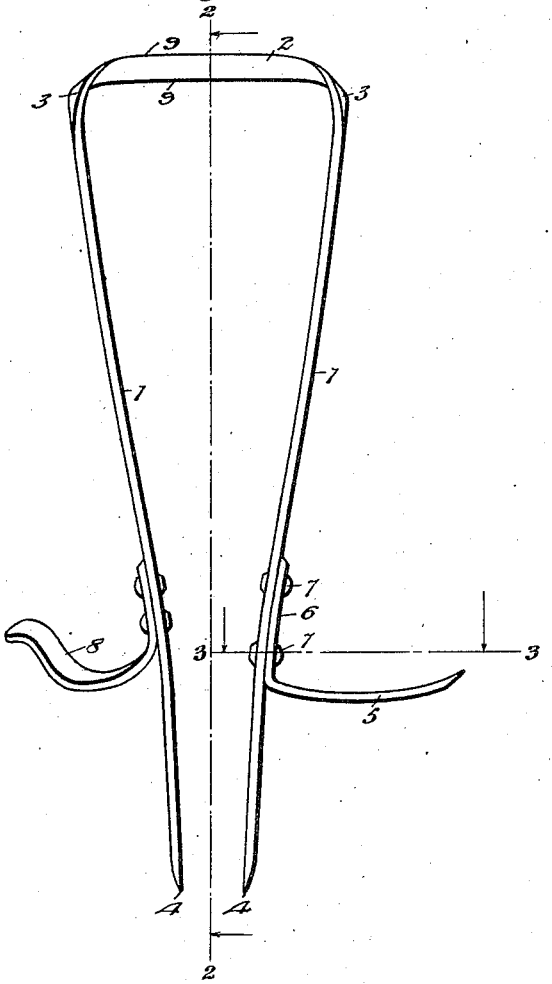
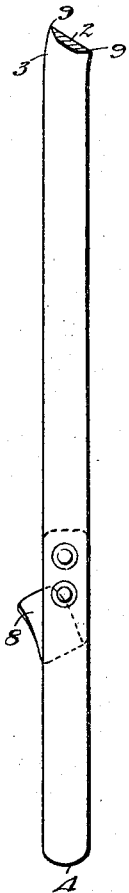
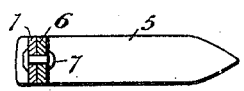
WITNESSES
INVENTOR
W. J. Kessel
BY
ATTORNEYS Patented Sept. 25, 1923.

1,469,160

UNITED STATES PATENT OFFICE.

WILLIAM JOHN KESSEL, OF FREEPORT, NEW YORK.

GARDEN TOOL.

Application filed March 11, 1922. Serial No. 542,904.

*To all whom it may concern:*

Be it known that I, WILLIAM J. KESSEL, a citizen of the United States, and a resident of Freeport, Long Island, in the county of Nassau and State of New York, have invented a new and Improved Garden Tool, of which the following is a full, clear, and exact description.

This invention relates to improvements in garden tools, an object of the invention being to provide a tool of this character which is primarily intended for weeding, and which can be used in a multiplicity of ways.

A further object is to provide a comparatively small weeding tool which can be used either for pulling, cutting or digging out weeds, and a tool which will be simple and practical in construction, strong, durable and efficient in use, light in weight, and comparatively inexpensive to manufacture.

With these and other objects in view, the invention consists in certain novel features of construction and combinations and arrangements of parts as will be more fully hereinafter described and pointed out in the claims.

In the accompanying drawings:—

Figure 1 is a view in front elevation of my improved garden tool;

Figure 2 is a view in longitudinal section therethrough on the line 2—2 of Figure 1; and Figure 3 is a transverse sectional view on the line 3—3 of Figure 1.

Referring in detail to the drawings, it will be seen that my improved tool is substantially U shaped, including a pair of arms 1, 1 and a relatively straight intermediate portion 2. The tool is formed of spring steel or any other metal suitable for the purpose, and the metal forming the tool is slightly twisted at the intermediate portion thereof, as indicated at 3, for a purpose which will hereinafter appear. The arms 1 of the tool approach each other adjacent their free ends and at their free ends are rounded and provided with cutting edges 4.

A blade 5 is formed with an angular extension 6 bolted or riveted, as indicated at 7, to the outside face of one of the arms adjacent its free end. This blade which extends laterally from the arm 1 to which it is attached is slightly curved and terminates in a pointed and sharpened cutting or digging end. A curved finger receiving bracket 8 extends laterally from the other arm 1, for a purpose which will hereinafter appear.

The intermediate portion 2 of the tool includes sharpened cutting edges 9.

The manner of using the tool is as follows:—For weed pulling, the device is used in the manner of a pair of pliers, the arms being grasped in the hand of the user with the forefinger resting upon the bracket 8 and the thumb upon the inner end of the blade 5. The free ends of the arms may be forced together to seize a weed and hold the same while it is being pulled out or uprooted. For digging out tougher weeds, the blade 5 is utilized, the device thus serving as a digging tool. When it is merely desired to cut the weeds instead of uprooting them, the user may grasp the tool and use either of the cutting edges 9 to chop off weeds or other undesirable plant growth. The intermediate portion of the tool may also be used for stirring the soil. The hook shaped blade 5 may also be used for the same purposes if desired.

It will be apparent from the foregoing description that I have invented a tool which may be used in a multiplicity of ways, and which will be particularly advantageous in working around a garden.

Although I have illustrated one of the preferred embodiments of my invention, it is to be understood that numerous slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. A garden tool comprising a U shaped handle, and a pointed blade fixed to and projecting laterally from one arm of the handle.

2. A garden tool comprising a U shaped handle, a pointed blade fixed to and projecting laterally from one arm of the handle, and a finger receiving bracket extending laterally from the other arm of the handle for the purpose specified.

WILLIAM JOHN KESSEL.